Jan. 1, 1957  H. W. COMPTON  2,776,060
WORKING DEVICE CONTROLLING MECHANISM FOR MATERIALS
HANDLING AND EXCAVATING MACHINES
Filed Aug. 6, 1953  4 Sheets-Sheet 1
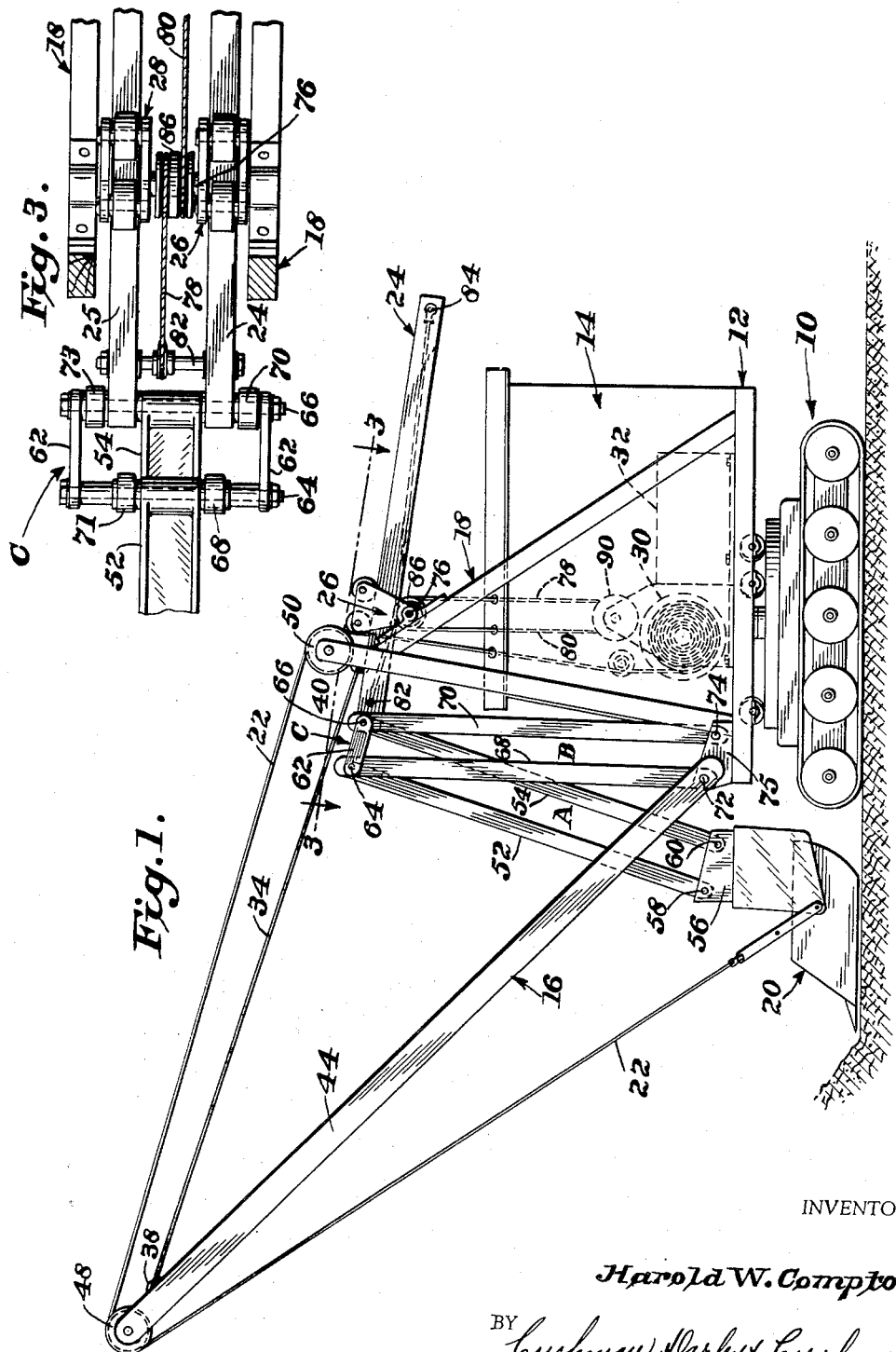
INVENTOR:
Harold W. Compton.
BY Cushman, Darby & Cushman
ATTORNEYS.

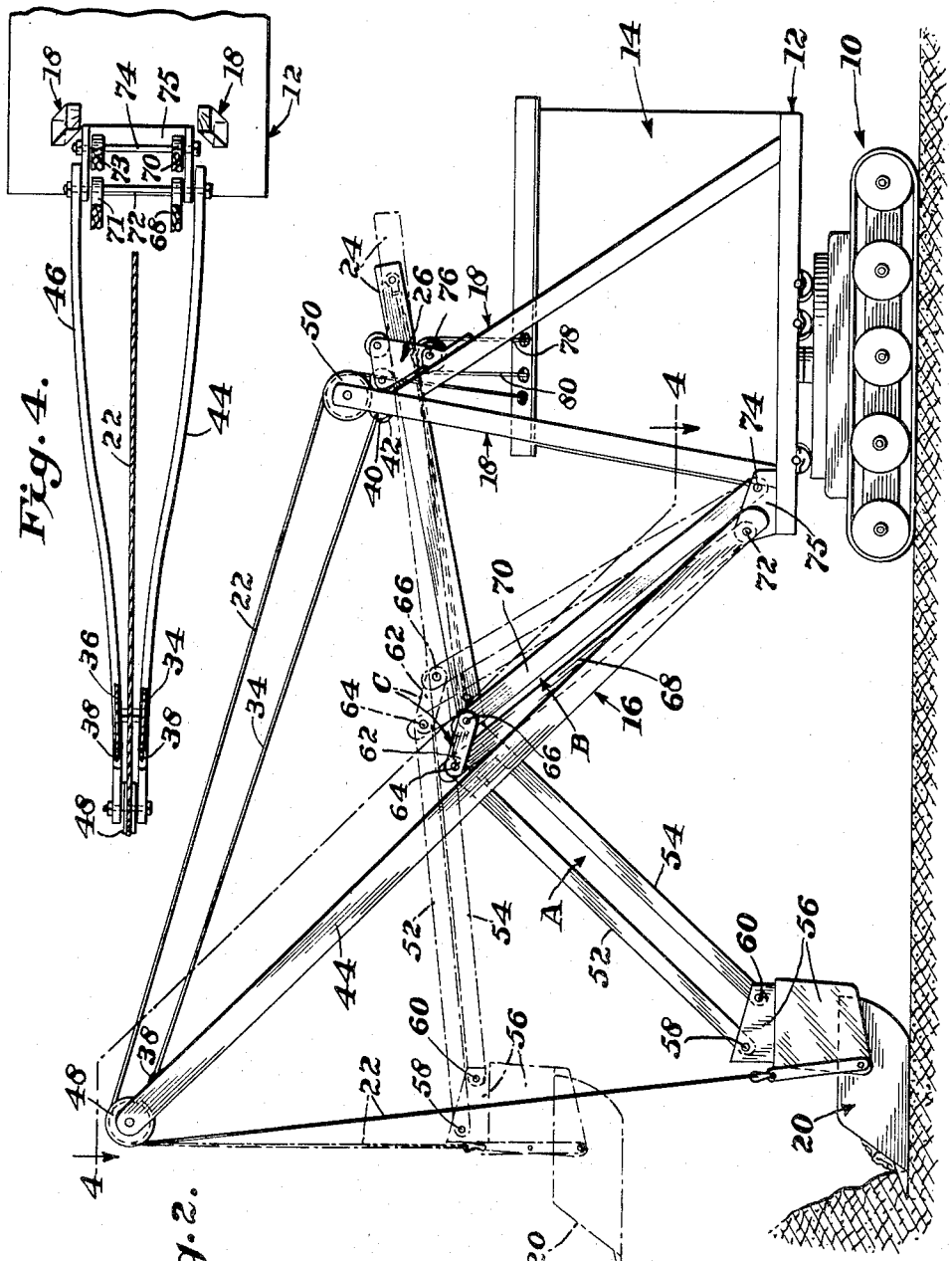

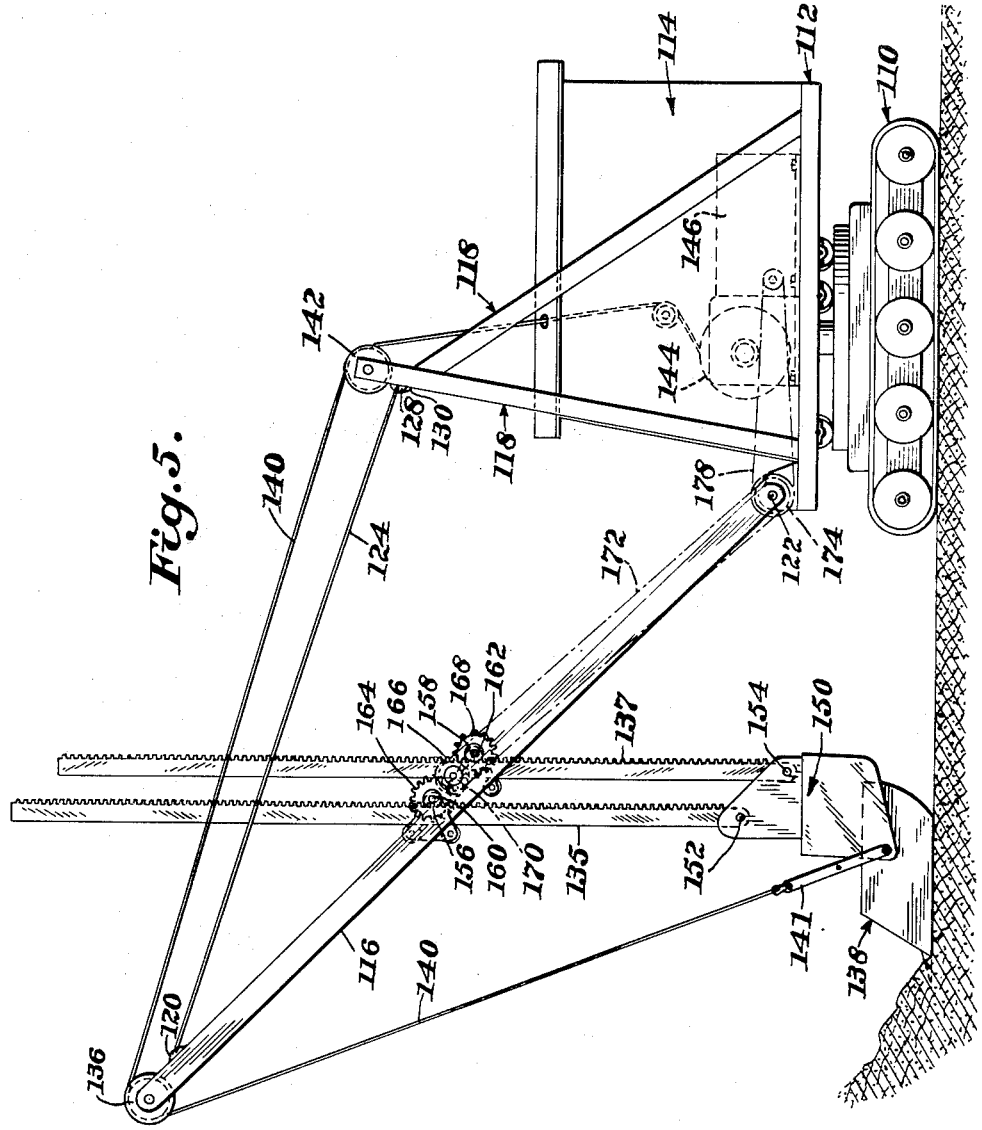

Jan. 1, 1957   H. W. COMPTON   2,776,060
WORKING DEVICE CONTROLLING MECHANISM FOR MATERIALS
HANDLING AND EXCAVATING MACHINES
Filed Aug. 6, 1953   4 Sheets-Sheet 4
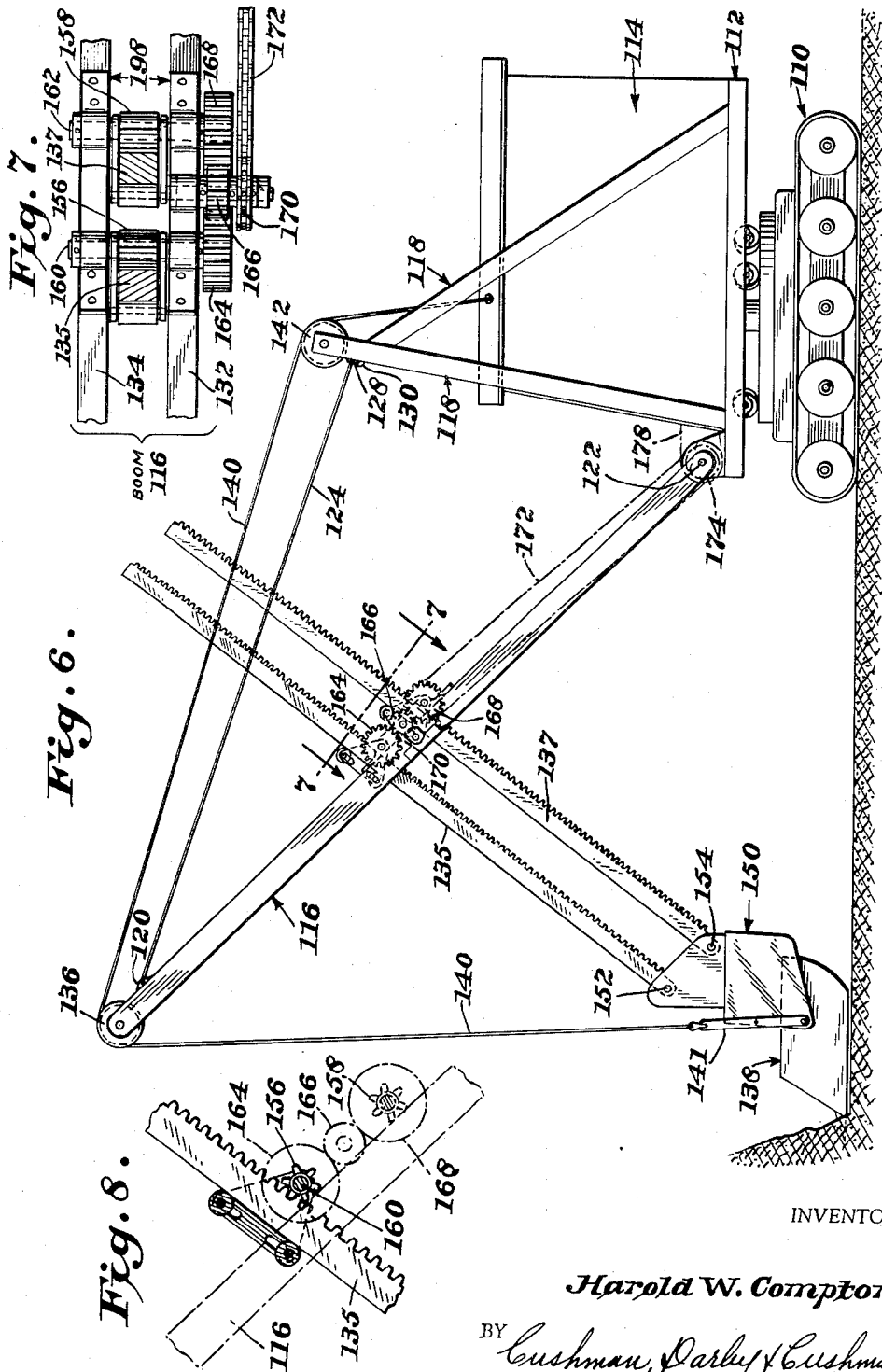
INVENTOR:
Harold W. Compton,
BY Cushman, Darby & Cushman
ATTORNEYS.

United States Patent Office 2,776,060
Patented Jan. 1, 1957

2,776,060

WORKING DEVICE CONTROLLING MECHANISM FOR MATERIALS HANDLING AND EXCAVATING MACHINES

Harold W. Compton, Pittsburg, Kans.

Application August 6, 1953, Serial No. 372,704

6 Claims. (Cl. 214—136)

My invention relates to an improvement in power excavating and materials handling machines and, more particularly, to mechanism for continuously controlling the operating angle of a working attachment or device in relation to the plane of the platform of such a machine, and for imparting thrusting and retracting movement to the working device.

It is to be understood that the term "working device" used throughout the description is to include various types of buckets, shovels, dippers, platforms or similar devices, used with power excavating and materials handling machines.

More specifically, my invention relates to and provides for a positive, continuous and automatic mechanism establishing and controlling the operating angle of a working device in relation to the platform of the machine and which, in addition, provides for thrusting and retracting the working device throughout each cycle of operation. The controlling mechanism of my invention, adapted for use with a modified conventional shovel having a relatively fixed boom construction, provides a machine having the operational characteristics of skimmer and horizontal thrust machines, drag shovels, back hoes, and the like, without the necessity of expending the time and power required to raise and lower the entire weight of a heavy boom during each cycle of operation.

While the basic idea of controlling the position of a working device with respect to the platform is old in prior art machines known to me, in the past, control to provide for continuous maintenance of a constant angular relationship between the working device and the platform has not been provided. In the case of skimmer or horizontal thrust type machines, the working device in the past has been parallel or maintained at a predetermined angular relationship with the supporting surface or horizon only so long as the boom is parallel to that surface. Once the boom was elevated, the raised working device was no longer maintained at the operating angle. That is, the operating angle of the working device was dependent upon the position of the boom and did not remain constant with respect to the platform of the machine or the supporting surface of the machine throughout operating cycles. In the case of the conventional power shovel with fixed or semi-fixed boom, the angular relationship between the working device and the platform of the machine changed continuously as the working device was hoisted or lowered, or thrusted or retracted.

With the above disadvantages of prior art machines in mind, it is, therefore, an object of my invention to provide controlling mechanism for the working device of an excavating machine whereby the operating cycle of the working device may be executed without the necessity of raising and lowering the boom of such machine.

Another object of my invention is to provide a working device controlling mechanism for effecting thrusting and retracting motion of the working device and to maintain such device continuously and automatically at a predetermined angular relationship with respect to the platform and supporting surface of the machine.

Another object of my invention is to provide a working device controlling mechanism adaptable to fixed boom type power excavating machines whereby the operating characteristics of a large variety of digging machines and materials handling machines may be obtained.

A still further object of my invention is to modify fixed boom type excavating machines to load material wherever it is desirable to have the working device automatically remain at a constant operating angle with respect to a floor, geological formation or any other situation, where it is necessary or desirable to maintain a level surface or to make a careful separation between the material picked up and that which remains, as in snow removal from streets, material loading in storage areas, coal loading in open pit mines, or ore loading in mines having sufficient head room to accommodate machines of this type.

A still further object of my invention is to provide a machine of this character having a fast operating cycle, greater efficiency and lower power consumption by reducing the dead weight of machinery set in motion during operation of the working device.

Reference is made to the accompanying drawings forming a part of my application and in which:

Figure 1 is a side elevation of a modified conventional shovel utilizing the first embodiment of my working device controlling mechanism and shown in retracted position;

Figure 2 is a side elevation of the machine of my invention as shown in Figure 1 wherein the operating device is in its extended or "thrusting" position;

Figure 3 is a plan view along the line 3—3 of Figure 1 illustrating my working device controlling mechanism and actuating means associated therewith;

Figure 4 is a diagrammatic plan view of the boom construction forming a part of the machine of Figure 1;

Figure 5 is a side elevation of a modified fixed boom machine utilizing a second embodiment of my invention wherein the working device is shown in semi-retracted position;

Figure 6 is a side elevation of the machine illustrated in Figure 5 in which the working device is in an extended or "thrusting" position;

Figure 7 is a sectional view along the line 7—7 of Figure 6 illustrating the working device handle actuating machinery; and Figure 8 is an enlarged sectional view of the saddle block retaining means employed to maintain the working device handles in operative position.

Two embodiments of my invention are presented. Generally, as illustrated in Figures 1, 2, 3 and 4, the first embodiment discloses a fixed boom type conventional shovel having a truck 10 surmounted by a revolving platform 12 carrying a cab 14 and a forwardly and upwardly inclined boom 16 attached at its foot at the forward portion of the deck. The operating platform 12 also supports an upwardly directed A-frame or gantry 18 with which is associated thrusting and retracting mechanism, subsequently described. A working device 20 may be raised or elevated by means of the cable 22 guided over a sheave 48 at the end of the boom and controlled from the platform. The thrusting and retracting movements imparted to the working device 20 are effected through a controlling mechanism comprising a pair of four bar linkage systems or parallelograms having a common side and which include portions of the working device 20 and platform 12 of the machine as linkage bars. An arm unit 24 extending rearwardly from the junction of the pair of four bar linkage systems is received within saddle block units 26 and 28 provided with actuating mechanism for producing longitudinal movement to the arm 24 which is, in turn, transmitted to the controlling mechanism or linkage systems and working device 20.

A second embodiment of my invention is disclosed in Figures 5, 6, 7 and 8 wherein the conventional shovel having a fixed boom 116 is provided with a working device controlling mechanism comprising a single four bar linkage or parallelogram. The thrusting and retracting movements imparted to the working device are effected by the lengthening or the shortening of a pair of rack and pinion type parallel dipper handles 135 and 137 driven from timing gears 164 and 168 carried on the boom intermediate its ends.

In more detail, the first embodiment of the invention illustrated in Figures 1, 2, 3, and 4 discloses my working device controlling mechanism as adapted to a conventional machine comprising the usual truck 10 on which is carried a revolving platform 12 and cab structure 14. The cab 14 houses the usual power plant and operating machinery, i. e., cable drums 30 and required power transmitting units 32 schematically illustrated in Figure 1. Extending upwardly from the deck of the cab is a gantry or a frame 18 and a boom 16 is mounted at its foot on the forward part of the platform 12 and supported at a substantially fixed inclination extending upwardly and forwardly by the usual cables 34 and 36 connected at points 38 near the outer end of the boom and at points 40 and 42 on the gantry. The boom as shown in Figure 4 consists of two elements 44 and 46 spaced apart at the foot and converging to a point at the outer end which is provided with a sheave 48. A working device 20 illustrated as a "skimmer" type bucket is situated forward of the cab 14 and is adapted to be elevated and lowered by a hoisting cable 22 extending upwardly from the bucket over the sheave 48 carried by the outer end of the boom 16 and is guided to the power-operated machinery within the cab 14 over a pulley 50 carried on the gantry 18.

The particular bucket shown represents only one type which may be employed, and as mentioned hereinbefore, any type of bucket may be used for adapting a conventional shovel for operation as a horizontal thrust machine, a drag shovel, a back hoe or other variety of machine.

The form of controlling mechanism used in Figures 1, 2, 3, and 4 and provided for maintaining the operating angle of the working device 20 constant with respect to the platform 12 of the machine essentially comprises an adaptation of the geometric principle that, if a quadrilateral has both pairs of sides equal, it is a parallelogram, regardless of the relative size of the included angles. I have utilized a pair of four bar linkage systems or parallelograms A and B having a common side C and extending between the boom elements 44 and 46. In this embodiment of the invention, parallelogram A is formed by attaching two "dipper-sticks" or "handles" 52 and 54 of equal length to the working device attachment 56 by means of pivot pins 58 and 60, whereby the handles are free to rotate through an extensive arc relative to the bucket. The opposite end of these handles 52 and 54 are maintained parallel to each other by a connecting unit 62 to which they are attached by pivot pins 64 and 66 so that the distance between the center of the pivot pins 64 and 66 is exactly the same as the distance between the centers of the pivot pins 58 and 60 carried by the bucket attachment 56. A second parallelogram or four bar linkage system B used to control the operating angle of the bucket with respect to the platform of the machine is obtained by attaching two pairs of links 68 and 70 and 71 and 73 to the pivot pins 64 and 66 of connecting unit 62 and then attaching their respective opposite ends to the platform of the machine with pivot pins 72 and 74 spaced apart the exact distance as pivot pins 64 and 66 are spaced.

Linkage system or parallelogram B is composed of two pairs of links spaced outwardly of the handle links 52 and 54 as shown in Figure 3 and essentially constitute a four bar linkage system including as links, the connecting unit, bars 68 and 70 and 71 and 73, and the mounting bracket 75 on the forward portion of the platform. The additional links of system or parallelogram B provide for lateral stability of the mechanism and more positive control of the working device 20.

To facilitate operation throughout the cyclic motion of the machine, the forward pivot pin 72 connecting links 68 and 71, to the platform bracket 75 is located at a slightly higher elevation than the pin 74 connecting links 70 and 73 to the platform bracket 75, and, likewise the forward pivot pin 58 on the bucket attachment is slightly higher than the rear pin 60. It is to be understood that the lines joining the centers of pins 58 and 60, 64 and 66, and 72 and 74 are parallel and by reason of the pair of linkage systems or parallelograms will remain parallel throughout all positions of the working device 20 during an operating cycle.

Thus, the operating angle of the bucket or working device 20 with respect to the platform of the machine is continuously, positively and automatically maintained during operation of the machine.

"Crowding" or forcing of the bucket into the material to be dug is effected by machinery shown in detail in Figure 3 including arms 24 and 25 connected to pivot pin 66 of the connecting unit 62 and extending rearwardly to be received by saddle blocks 26 and 28 carried by the gantry 18. These arms are mounted for longitudinal movement as a unit and for oscillating movement about a transverse shaft 76 forming a part of and supporting the saddle units 26 and 28. Actuating mechanism for thrusting and retracting the arms 24 and 25 is associated with the saddle blocks 26 and 28 and herein takes the form of cable 78 and 80 connected to opposite ends of the arms at anchors 82 and 84 and passing over the double sheave 86 also carried by the shaft 76 and thence to double wind drum 90 within the cab. Thus, thrusting out of the bucket to crowd the same into material to be handled is effected when cable 80 anchored at 84 is drawn into the cab over the sheave 86 and during this operation, cable 78 is permitted to pay out over the sheave 86. In retracting the bucket, the reverse occurs and cable 78 is drawn into the cab, over the sheave 86 while the cable 80 is permitted to pay out.

It will be appreciated that the bucket controlling mechanism is used with a substantially fixed boom machine and that thrusting and retracting during the operating cycle of the working device is effected through the parallelogram linkage systems in turn controlled (during thrusting and retracting) by power actuated arms 24 and 25. The boom 16 is used merely for supporting the hoisting cable system and does not have to be continuously raised and lowered during the excavating cycle. The result is a conventional fixed boom shovel modified so that the operating angle of the working device in relation to the basic machine continuously remains fixed, throughout the cycles of operation.

The second embodiment of my working device controlling mechanism is illustrated in Figures 5, 6, 7 and 8 wherein a conventional, fixed boom shovel similar to the shovel of the first embodiment may be employed. The usual truck 110 surmounted by the revolving platform 112 may be provided with a cab 114. A relatively fixed boom 116 extends upwardly and forwardly of the cab 114 and is mounted at its foot to the platform at point 122. Cables 124 may be connected to the outer end of the booms at points 120 and will be anchored to laterally spaced apart elements of the gantry 118 at points 128 and 130, to maintain the boom 116 at a fixed angle of inclination.

The boom 116 as shown in part in Figure 7 comprises a pair of parallel spaced apart elements 132 and 134 provided with a sheave 136 at its outer free end. A working device 138 is located forward of the platform 112 and may be raised and lowered by a hoisting cable 140 connected to the bail 141 and thence passing upwardly over the sheave 136 of the boom to be guided by a sheave 142 carried by gantry 118 to a cable operating drum 144 operated by the power plant 146, diagrammatically illustrated in Figure 5.

The working device controlling mechanism of this embodiment of my invention comprises a four bar linkage system located within the longitudinal space 198 formed between the boom elements 132 and 134 and comprises a pair of bucket handles 135 and 137 of equal length connected at their outer ends to a working device attachment 150 by pivot pins 152 and 154 so that the handles are free to rotate through a considerable arc in relation to the bucket. These handles are essentially of rack formation and are supported within the boom by the pinion gears 156 and 158 of the same size, carried by shafts 160 and 162 the same distance apart center to center as the center to center distance of pivot pins 152 and 154 on the working device attachment 150. As illustrated in Figures 5 and 6 the pivot pin 152 is located at a higher elevation on the attachment 150 than pivot pin 154. In addition, the center lines joining the two sets of pivot points just mentioned are parallel and remain so during the cyclic operation of the machine; thus, completing the four bar linkage or parallelogram formed by the handles 135, 137, the working device attachment and the portion of the boom between pivot shafts 160 and 162. The two handles 135 and 137 are moved in synchronism by a train of timing gears 164, 166 and 168 whereby as gear 166 is operated clockwise as viewed in Figure 5 the pinion gears 156 and 158 will operate to extend or thrust the working device 138 outwardly of machine, and likewise counterclockwise movement will cause retracting movement of the same. Power is transmitted to the gear 166 by means of chain and sprocket drive comprising sprocket 170 chain 172 sprocket 174 on a jack shaft 122 and chain 178 driven by the power plant machinery 146. Thus, actuation of the control mechanism may be effected at any adjusted position of the boom which normally remains in an adjusted vertical position during operating cycles of the machine.

*Summary*

In Figures 1 and 3 of the embodiment illustrated in Figures 1 through 4, I have shown means within the cab 14 for actuating the hoisting cable system for the working device and, in addition, actuating mechanism for controlling the arm unit 24 and 25 effecting the thrusting and retracting. Although these actuating means are not represented in Figure 2, it will be understood that this figure illustrates the machine of Figure 1 in the extended or thrusting position.

With regard to the embodiment illustrated in Figures 5 through 8 the actuation of the working device of Figure 6 is the same as shown in Figure 5.

The operation of the two embodiments will be apparent from the foregoing descriptions and in each embodiment the mechanisms controlling the working device will automatically and continuously maintain the operating angle of the same constant throughout the thrusting and retracting movements of the working device regardless of the type of device employed or the machine operating characteristics utilized.

It is to be understood that any conventional method of dumping the working devices may be employed although dumping means as such has not been illustrated in the drawings as it does not form any part of my invention.

Having now described and illustrated two embodiments of my invention, I wish it to be understood that my invention is not to be limited to the specific form or arrangements of parts herein described and shown, except insofar as such limitations are specified in the accompanying claims.

I claim:

1. A material handling machine of the type described comprising a movable truck, a platform mounted on said truck for pivotal movement about a vertical axis, a boom secured to said platform and extending upwardly and outwardly therefrom at a relatively large angle with respect to the horizontal, a material working device, a pair of dipper sticks having their lower ends pivotally connected to said working device along spaced transverse axes, power-operated means for moving said dipper sticks longitudinally, said power-operated means providing pivotal connections for the upper end portions of said dipper sticks about spaced transverse axes, and extensible and retractable means operatively connected between the outer end of said boom and said device for effecting a pivotal movement of said dipper sticks about their upper pivotal connections either in conjunction with the longitudinal movement of the latter or in the absence of such movement.

2. A machine as defined in claim 1 wherein said power-operated means comprises a pair of spaced shafts journaled on said boom intermediate its ends, a pinion secured to each of said shafts, a rack formed on each of said dipper sticks engageable with a pinion, guide means for maintaining said racks in engagement with said pinions and for providing the pivotal connections of the upper end portions of said dipper sticks about their respective shafts as pivotal axes, and means for rotating said shafts to effect the longitudinal movement of said dipper sticks.

3. A machine as defined in claim 1 wherein said power-operated means comprises a pair of spaced links having their inner ends pivoted to said platform about spaced transverse axes and their outer ends pivoted to the upper ends of the dipper sticks respectively to provide the pivotal connections of the upper end portions thereof, and means for moving said links about their platform pivotal axes to effect the longitudinal movement of said dipper sticks.

4. A machine of the type described comprising a movable truck, a platform on said truck for pivotal movement about a vertical axis, a boom secured to said platform and extending upwardly and outwardly therefrom at a relatively large angle with respect to the horizontal, a material working device, a pair of parallel dipper sticks having their lower ends pivotally connected with said working device about spaced transverse axes, means for pivotally supporting the upper end portions of said dipper sticks with respect to said platform about spaced transverse axes, means for effecting longitudinal movement of said dipper sticks together, and extensible and retractable cable means operatively connected between the outer end of said boom and said working device for effecting a pivotal movement of said dipper sticks about their upper pivotal axes either in conjunction with the longitudinal movement of the latter or in the absence of such movement with said working device being maintained at a constant angular position wtih respect to said platform.

5. A machine as defined in claim 4 wherein said means for pivotally supporting the upper end portions of said dipper sticks comprises guide members slidably receiving the upper end portions of said dipper sticks and pivotally mounted on said boom about spaced transverse axes, and wherein said dipper stick moving means comprises shafts journaled on said boom about the axes of said guide members, pinions on said shafts, racks on said dipper sticks engageable with said pinions, and means for rotating said shafts.

6. A machine as defined in claim 4, wherein said means for pivotally supporting the upper end portions of said dipper sticks comprises a pair of parallel links having their inner ends pivotally connected with said platform and their outer ends respectively pivotally connected with the upper ends of said dipper sticks, and wherein said dipper stick moving means comprises means for moving said links about their connection with said platform.

References Cited in the file of this patent

UNITED STATES PATENTS

| | | |
|---|---|---|
| 14,068 | Savage | Jan. 8, 1856 |
| 16,519 | Anderson | Feb. 3, 1857 |
| 553,082 | Thew | Jan. 14, 1896 |
| 1,454,781 | Wilt | May 8, 1923 |
| 1,857,302 | Hawkins | May 10, 1932 |
| 2,139,255 | Bixby | Dec. 6, 1938 |

FOREIGN PATENTS

| | | |
|---|---|---|
| 544,984 | Great Britain | May 6, 1942 |